May 1, 1956     H. L. CROWLEY     2,744,002
PROCESS OF MAKING POWDERED IRON IN A DISCRETE CRYSTALLINE FORM
Filed Aug. 24, 1952     6 Sheets-Sheet 1

INVENTOR
HENRY L. CROWLEY
BY
ATTORNEY

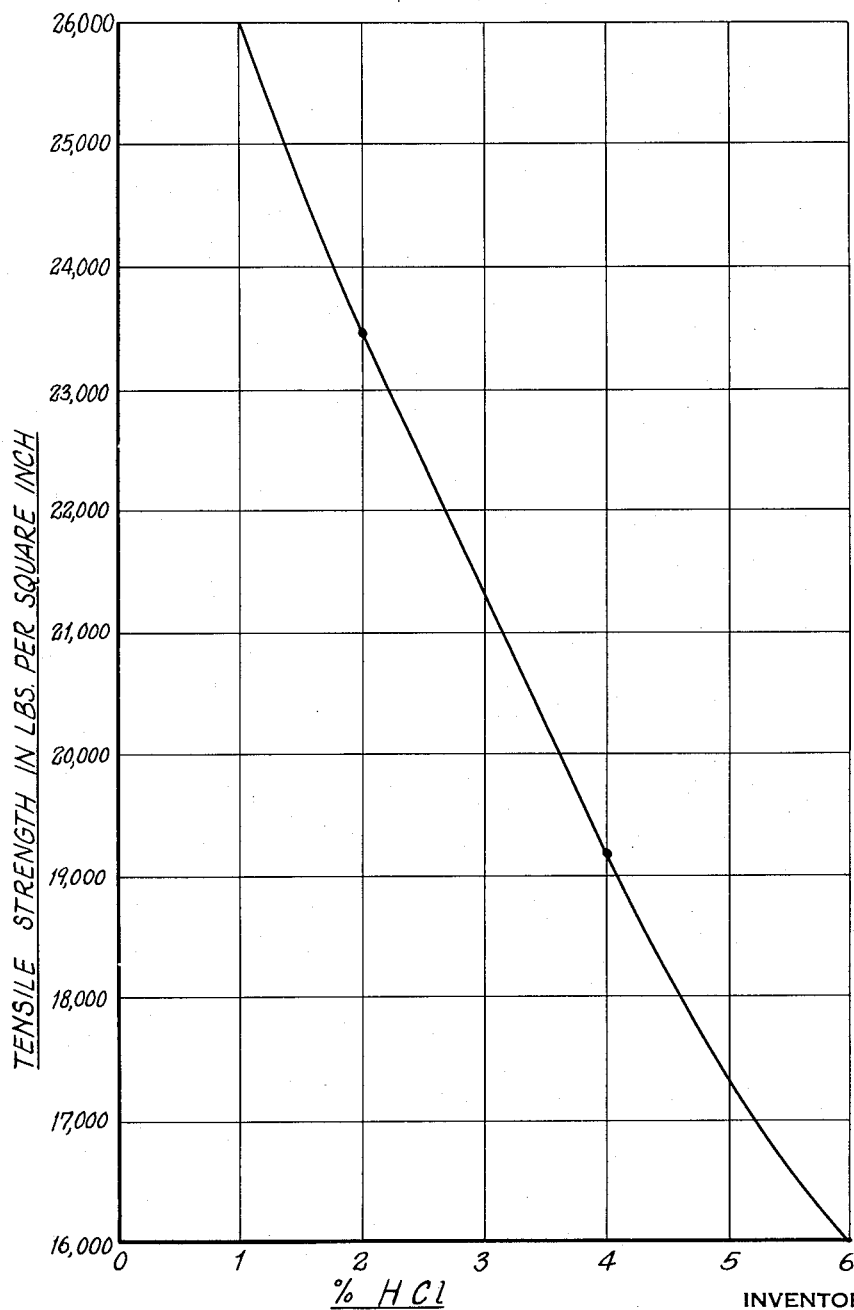

INVENTOR
HENRY L. CROWLEY
BY Robert S. Dunham
ATTORNEYS

INVENTOR
HENRY L. CROWLEY
BY Robert S. Dunham
ATTORNEYS

United States Patent Office 2,744,002
Patented May 1, 1956

2,744,002

PROCESS OF MAKING POWDERED IRON IN A DISCRETE CRYSTALLINE FORM

Henry L. Crowley, South Orange, N. J., assignor, by mesne assignments, to Republic Steel Corporation, Cleveland, Ohio, a corporation of New Jersey Application August 24, 1953, Serial No. 375,927

4 Claims. (Cl. 75—.5)

The present invention relates to a process for the production of metallic iron in powder form by the reduction of iron oxide and particularly to the production of iron powder having predetermined physical properties.

The present invention is a continuation-in-part of my prior and co-pending application in the United States, Serial No. 234,677 filed June 30, 1951, and entitled "Process of Making Powdered Iron in Discrete Crystalline Form," which is now abandoned and replaced by the present application.

The reduction of iron oxide at temperatures below the melting point of iron to form either sponge iron or iron powder is well known to the prior art. As will be more particularly pointed out and illustrated by means of photomicrographs hereinafter referred to, such reduction appears to take place by means of a so-called "subtractive process." By this it is meant that the reduction takes place by means of the direct removal of oxygen atoms from the iron oxide crystal lattice. Such a process results in a porous structure with the microscopic appearance of having had portions thereof gouged out. Iron powder of this type is characterized, among other things, by the comparative difficulty with which it is molded into parts and the relatively high pressures necessary to form from such powder a part having a given density.

It has been found that the basic properties of iron powder produced by conventional so-called "subtractive" reduction processes are fixed and incapable of variation beyond a very narrow range so that fabricators must adapt their process to the particular shrinkage, tensile strength and other physical properties of the iron powder available.

It is an object of this invention, therefore, to provide a process for making iron powder of an "additive" type, rather than of the conventional "subtractive" type and of producing such an iron powder directly from iron oxide without the necessity of forming an intermediate product which requires special handling or treatment.

It is a further object of this invention to provide a method for producing an iron powder, the basic properties of which are controllable within a wide range so that, by adjusting the conditions of the process, a powder having predetermined and controllably variable characteristics, for example as to compressibility, tensile strength, and shrinkage, may be produced.

It is a still further object of the present invention to provide a method for producing iron powder which is capable of being pressed to a given density at pressures substantially lower than those now required to produce the same density in conventional iron powder.

It is another object of this invention to provide a process for reducing iron oxide to metallic iron such that the reduced iron will be in such a condition as to be more easily separable from inert gangue materials by virtue of being in a discrete crystalline form.

Further objects of this invention will be in part pointed out and will in part be apparent from the subsequent description.

The production of "additive" type iron powder is effected by the reduction of iron oxide by hydrogen containing a controlled and predetermined concentration of hydrogen chloride.

According to present belief as to the chemical mechanism of the invention, the reduction of the iron oxide is carried out so that iron values will be converted to the form of ferrous oxide (FeO) which, in turn, will be reacted with the hydrogen chloride to form $FeCl_2$ vapor. The $FeCl_2$ is then reduced in its vapor form to metallic iron and deposits on crystals of iron already formed, causing them to grow larger. This metallic iron is characterized by a dense crystalline structure as opposed to a porous structure resulting from the conventional reduction of iron oxides by the so-called "subtractive" method. A further distinguishing characteristic of the "additive" iron is that the shape and size of such particles is independent of the shape and size of the iron oxide products from which they have been formed. As will be pointed out and illustrated hereinafter, conventional iron powder has the same general shape as the iron oxide particles from which it has been reduced. This shape and size can be altered only by substantial grinding subsequent to reduction. On the other hand, iron made according to the process of the present invention is characterized by a particle size and shape largely or entirely independent of the particle size and shape of the iron oxide from which it has been reduced. It is believed that this result occurs because the iron values have been converted to a vapor phase, i. e., ferrous chloride, and subsequently reduced and recrystallized.

The ferrous chloride understood to be produced as an intermediate in the reduction process of the present invention exists only in an evanescent state and as such cannot be isolated during any phase of the reduction. It has been found that in order to make metallic iron having superior physical properties when comminuted to powder form, especially with regard to ease of moldability and at the same time having controllable physical properties, a sufficient concentration of hydrogen chloride must be present in the reducing gas so as to cause a substantial amount of recrystallization of the iron values in the iron oxide by effecting the formation of sufficient ferrous chloride. It has been found that the concentration of hydrogen chloride necessary to accomplish this is a function of the temperature of reduction. This is illustrated graphically in Fig. 2 of the accompanying drawings.

Since the amount of hydrogen chloride at any given temperature, within the limits set forth hereinafter, determines the amount of recrystallization of iron taking place, it follows that the physical properties of the resultant iron can be controlled by controlling the amount of hydrogen chloride present in the reducing gases. The minimum amount of hydrogen chloride present is that which will produce sufficient recrystallization as aforesaid to effect substantial improvements over conventional iron powder. The maximum hydrogen chloride concentration tolerable at the temperature employed is that which will begin to produce iron chlorides in substantial quantities in such form that these chlorides, either ferric or ferrous, will be present in other than an evanescent state. Thus the process of the invention is practiced by utilizing a reducing gas having a temperature and hydrogen chloride concentration defined by the area indicated as ABCDE in Fig. 2.

Summarizing the present invention, a moldable crystalline iron powder having predetermined physical properties useful in powder metallurgy is produced by contacting iron oxide with a reducing gas containing hydrogen as its essential active reducing ingredient, together with hydrogen chloride, the active hydrogen chloride concentration and the temperature of this reducing gas being such as to be within the area ABCDE in Figure 2. Subsequent to reduction, the metallic iron is cooled in a non-oxidizing atmosphere to a temperature such that it may be exposed to air without substantial spontaneous oxidation.

The reduced iron may then either be comminuted to powder or it may be already in powder form. In some cases it is desirable to form the iron into self-sustaining billets as by rolling or otherwise directly compacting the reduced product in whatever form it may be after the reduction step. In the event substantial gangue is present in the reduced product, a separation step may directly follow the reducing step.

The process of the present invention will be described with reference to the accompanying drawings and photomicrographs in which:

Fig. 5 is a plot showing the relationship between tensile strength of parts fabricated from iron powder and the hydrogen chloride content of the reducing gas employed in making these powders;

Turning now to the process of the present invention, there is used as a starting material, an iron oxide-containing material consisting of, as to its iron oxide values, one or more of the oxides: $Fe_2O_3$, $Fe_3O_4$ and $FeO$. In order that the desired "additive" iron be produced, it is believed necessary that all of these iron oxide values must be FeO or of such a form as to be capable of passing through the stage of FeO. Thus the atomic ratio of oxygen to iron in the iron oxide of the starting material must be at least one. The starting material may also contain some metallic iron of the "subtractive" variety, the presence of which may be desirable for certain specific purposes as will be pointed out in subsequent examples.

In a presently preferred embodiment of the invention, the iron oxide-containing material is contacted with the reducing gas after the concentrate has been formed in pellets of about ¾ inch diameter. Pelletizing is carried out in order that the reduction reaction may be effected by gas-to-solid contact without blowing solid material out of the reaction zone. It will be understood that in other modes of practicing the invention, the oxide starting material may be in pulverulent form. The oxide to be pelletized has been ground and screened so that all of it will pass through a sixty mesh screen. The screened oxide is then mixed with an organic binder, preferably of the cornstarch type in the amount of less than 1% by weight and is pelletized in a conventional manner. This pelletizing operation may be carried out in an inclined rotary drum into which enough moisture is added so that the particles will adhere to one another and roll up into pellets of desired size. Suitable mechanism is provided for recycling undersized pellets so that they will be passed through the drum a sufficient number of times to grow to the desired ¾ inch diameter size.

Figure 1:
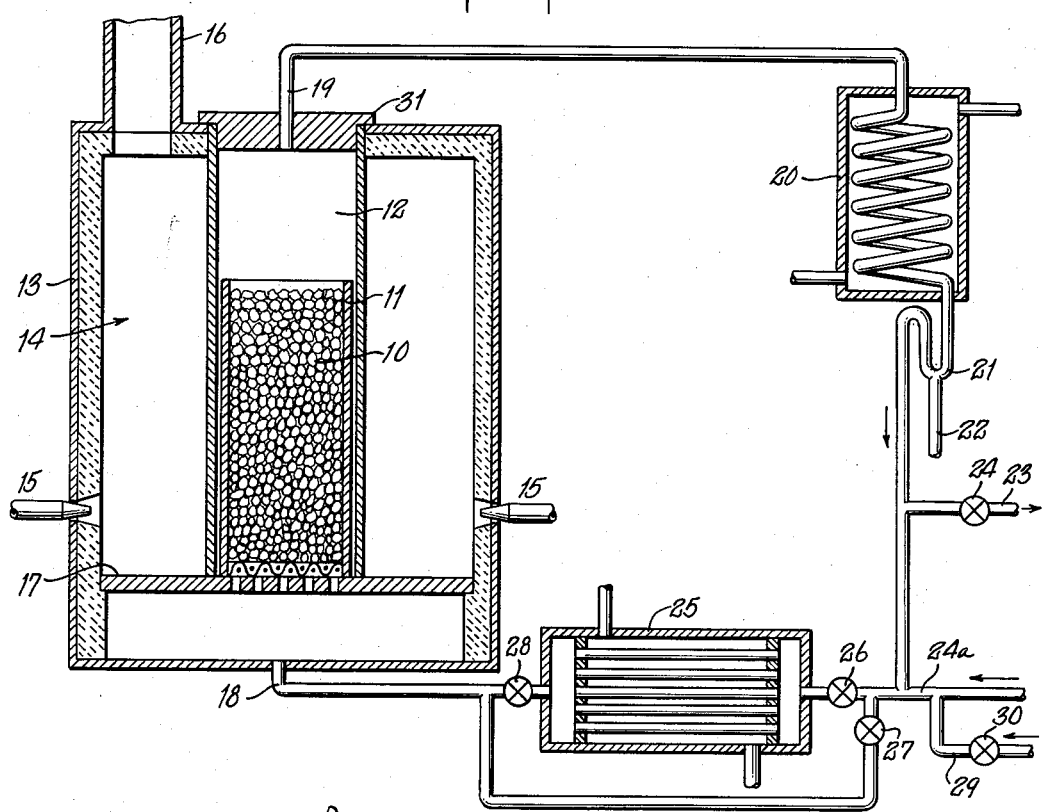
Fig. 1 is a diagrammatic illustration of an apparatus used in carrying out the present process.

The apparatus in which the reduction is carried out may be any type of apparatus which is useful for gas-to-solid contact reaction, including such conventional apparatus as rotary kilns and shaft furnaces. As such, it is apparent that the reduction may be carried out either on a continuous or batchwise basis. It is at present preferred to carry out the process of the invention as a batch operation utilizing pellets of iron oxide concentrate made as aforesaid. Apparatus for use in such an operation is illustrated diagrammatically in Fig. 1.

The iron oxide pellets indicated at 10 are placed in a cylindrical basket 11 provided with a gas-pervious bottom. The loaded basket is placed in a centrally located reaction chamber 12 of a reduction furnace 13. The reduction furnace is provided with a muffle 14 through which hot gases emitted from burners 15 are allowed to pass, escaping through a flue 16. The cylindrical basket 11 rests on a grate 17 which is also gas-pervious. In a typical charge, the basket 11 is about 5" in inside diameter and is loaded with a column of pellets to a depth of about 4 feet. Such a charge weighs about 65 pounds. The reducing gas is introduced at the bottom of the furnace through an inlet pipe 18 and passes upwardly through the column of pellets in the reaction chamber 12, leaving the top of the furnace by means of an exit pipe 19. The spent reducing gases, which have some of their hydrogen content converted to water vapor by the chemical reaction taking place in the reactor, are conveyed by the pipe 19 to a condenser 20, wherein the water vapor and hydrogen chloride contents of the spent gases are converted to a hydrochloric acid solution, which is removed at a trap 21 and thence passes out of the system through a pipe 22. The gaseous hydrogen chloride content of this solution may be regenerated for subsequent re-use in the process. In the event that nitrogen is included as a constituent of the reducing gas, or if for some other reason a bleeding of the spent gas is required, this may be done through a pipe 23 which is controlled by means of a valve 24.

After the undesired water vapor has been removed, sufficient make-up hydrogen and gaseous hydrogen chloride are added through a pipe 24a and the mixture is then passed through a preheater 25 to raise it to the desired reaction temperature. The reducing gas then re-enters the reaction zone through the pipe 18, as aforesaid, for further reaction.

At the end of the reducing period, the reducing gas is by-passed around the preheater 25 by proper manipulation of valves 26, 27 and 28 and is fed into the reaction chamber 13 at room temperature through the pipe 18 in order to cool the reduced iron pellets. The cooling step is carried out so that the metallic iron product will not be subject to spontaneous oxidation on contact with the atmosphere. The metallic iron produced by the reduction of iron oxides according to the present invention is remarkable in that it is non-pyrophoric and, once it has been cooled to a temperature of about 200–300° F., it may be safely exposed to air without any special treatment other than the simple cooling step aforesaid. After cooling, the reaction zone is purged with nitrogen, which is introduced through a pipe 29 controlled by a valve 30. The reduction reaction is carried out using a reducing gas in the temperature range of 1200° F. to 2000° F. for a period of about three hours; at the end of which time the iron oxide pellets have been converted to friable pellets of metallic iron. The cooling period lasts for about 20 minutes; and after the aforesaid nitrogen purge, the basket 11 with its contents of friable iron pellets is removed from the furnace as by removing a cover 31 and lifting out the basket 11.

In some cases it is desirable to carry out a preliminary partial reduction prior to the contacting of the primary reducing gas, i. e., that containing hydrogen chloride with the iron oxide-containing material. Since it is believed desirable, in accordance with the principles aforesaid, to convert the iron values to an intermediate ferrous oxide stage, from which they are chloridized to $FeCl_2$, it is sometimes preferred to carry out this preliminary reduction step in the absence of hydrogen chloride. In this preliminary reduction step, the iron oxide is converted to the form of ferrous oxide. This may be done by any suitable reducing agent such as hydrogen, carbon monoxide or in some cases by solid carbon. A minimum temperature of 1200° F. and preferably, at least about 1250° F. is generally used to produce FeO at a reasonable rate when gaseous reducing agents are employed. Temperatures up to about 2000° F. may be employed in this step, but generally it is undesirable to operate at above 1400° F. since the advantages of rapidity of reaction gained by higher temperatures are not pronounced enough to compensate for the increased rate of deterioration of equipment associated with the use of such higher temperatures. In certain instances it may be desirable to carry out a preliminary reducing step in such a way as to produce some conventional "subtractive" iron prior to the introduction of the hydrogen chloride-containing gas.

The most important step of the process of the present invention is the reduction step in which the iron oxide-containing material is converted to metallic iron by contact with a gas containing hydrogen and hydrogen chloride. As has been pointed out above, conventional iron oxide reductions involve an essentially subtractive process which may be represented by the equation:

(1)    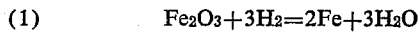

In making iron by the process of the present invention, the following chemical reactions are believed to take place:

(2) 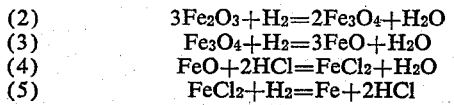
(3)
(4)
(5)

This series of reactions produce an entirely different form of metallic iron than could be produced by the process represented by Equation 1. In order that the iron be formed by Equations 2, 3, 4 and 5, and particularly by steps including Equations 4 and 5, rather than by Equation 1, it is necessary to control conditions of temperature and HCl concentrations very carefully. In addition, it has been found that temperatures and the concentration of HCl in the reducing gas have an intimate effect upon the physical properties of the iron produced, possibly because of the effect they have upon the degree of recrystallization taking place.

Although the presence of hydrogen in the reducing gas is essential for the practice of the present invention, the reducing gas may contain other constituents. In some cases, these other constituents may be inert gases such as nitrogen or water vapor or they may be other reducing gases such as methane or carbon monoxide.

It is to be understood that Equations 4 and 5 represent a single continuous process and that $FeCl_2$ exists mainly as an evanescent intermediate only. The process could not be stopped at an intermediate point and yield any discrete amount of $FeCl_2$. It is also believed that the reaction represented by Equation 4 takes place with the ferrous chloride in the vapor, rather than in the solid stage. The reason for this belief is that, as will become apparent from photomicrographs hereinafter referred to, the shape of the metallic iron particles formed by the process of the present invention is entirely different from that of the iron oxide material from which it is made. This difference clearly indicates a change of phase and the dense, crystalline structure of the iron particle is strongly suggestive of a product that has been condensed from a vapor to a solid state. Iron formed by this condensation method has been and is referred to in this specification as "additive" iron to distinguish it from iron made according to the conventional prior art processes exemplified by Equation 1 which is herein denominated "subtractive" iron.

In order that "additive" iron be produced it is believed necessary that the conditions of the reaction be such that FeO is sufficiently stable so that it can be converted to $FeCl_2$ by means of reaction with the hydrogen chloride in the reducing gas. FeO is unstable at certain temperatures, tending to decompose into metallic iron and $Fe_3O_4$. This reaction is often referred to as the "Wustite Reversion" and takes place most rapidly at temperatures around 900° F. It has been found, however, that it will occur spontaneously at higher and lower temperatures, the upper limit being somewhat below 1200° F. At temperatures above 1200° F. FeO becomes sufficiently stable so that it may be converted to $FeCl_2$ as aforesaid. Thus, the minimum temperature at which the process can be carried out is believed to be dependent upon the stability of FeO and hence must be at least 1200° F.

The upper temperature limit of the reduction reaction is less sharply critical and it is determined mainly by considerations of engineering efficiency and physical properties of the resulting iron powder. It is found that at temperatures above 2000° F. the pellets into which the iron oxide-containing material is preferably formed, prior to the reduction, become so sintered that they become very difficult to comminute to iron powder after reduction. Expensive and extensive grinding must be employed; and even then, a work-hardened powder of inferior physical properties, relatively undesirable for powder metallurgy, is obtained. In addition, relatively high temperatures result in more rapid deterioration of the equipment employed.

In practice, it has been found that temperatures between about 1250° F. and about 1650° F. are the most practical from the operating standpoint and that powders produced in this temperature range are generally most satisfactory for powder metallurgy purposes.

Equally important is believed to be the maintenance of conditions that will permit the presence of a substantial amount of $FeCl_2$ vapor in the reaction zone. Below 1200° F., the vapor pressure of FeCl₂ is extremely low. The amount of FeCl₂ vapor that can exist is dependent not only upon the temperature employed but also upon the concentration of hydrogen chloride present. Thus, it is not sufficient merely that some hydrogen chloride be admixed with the reducing gas, but it has been found that at least a critical minimum concentration must be present. This amount is dependent upon the temperature employed. If less than the critical concentration of hydrogen chloride is present, it will be thermodynamically impossible for a sufficient amount of FeCl₂ vapor to be formed in order that the conversion of iron oxide to metallic iron take place by means of Equations 4 and 5, rather than by means of Equation 1. If too small a concentration of hydrogen chloride is present at any given time, the amount of FeCl₂ vapor will be very small so that the rate of formation of "additive" iron by means of the reaction indicated in Equation 5 will be extremely slow. If this reaction takes place too slowly, the hydrogen present in the reducing gas will react with the Fe₂O₃ present by means of the reaction indicated by Equation 1 and the iron oxide values will be converted to "subtractive" iron.

Figure 2:
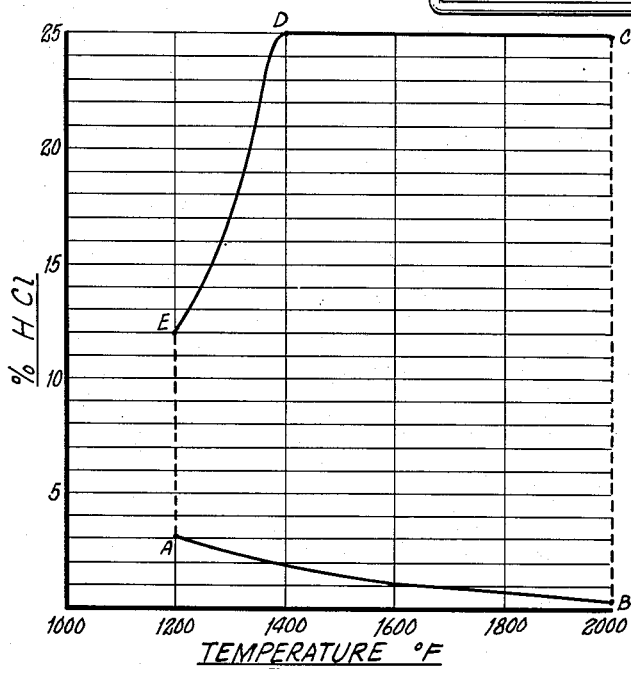
Fig. 2 illustrates a plot showing the relationship between hydrogen chloride concentration and temperature and defining, by means of these two coordinates, an area within which the present invention is practiced.

Fig. 2 sets forth a graph on which is plotted the critical relationship between temperature and hydrogen chloride concentration. This curve, for minimum hydrogen chloride, is represented by the line A—B. The line A—B was made by plotting the values contained in Table I below:

TABLE I

| Temperature in ° F. | Minimum Necessary Percent HCl by Volume in the Reducing Gas |
|---|---|
| 1,200 | 3 |
| 1,400 | 2 |
| 1,600 | 1 |
| 1,800 | 0.75 |
| 2,000 | 0.25 |

It has been found within the temperature range 1200° F. and 2000° F. that when sufficient hydrogen chloride is employed to provide at least this minimum concentration, sufficient recrystallization of the iron values will have taken place so as to produce an iron powder distinct from and superior to that of the prior art iron powders made by conventional "subtractive" methods.

Figure 3:
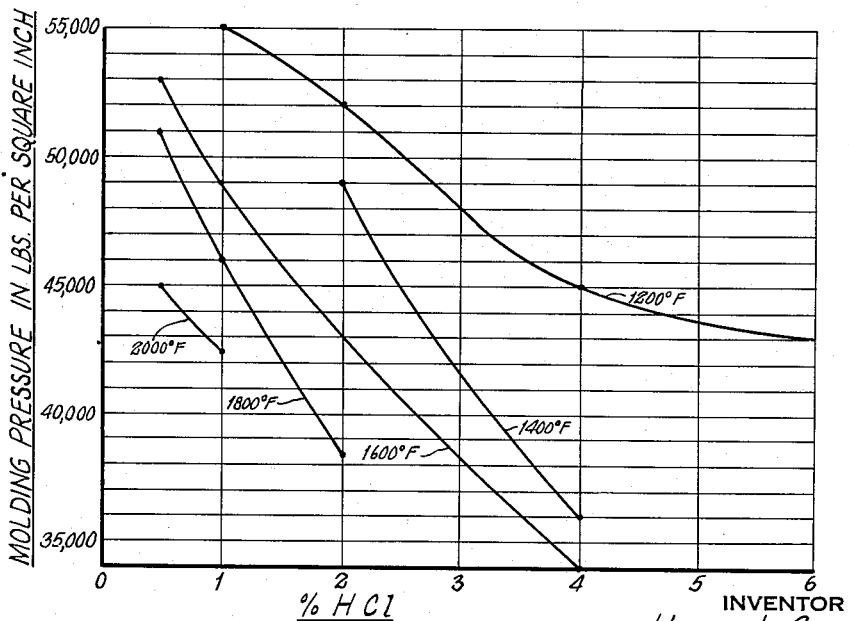
Fig. 3 is a plot showing the relationship between the molding pressure required to produce iron parts of a specified density and the concentration of hydrogen chloride in the reducing gas used to make the powders from which these parts were fabricated.

The basis for the selection of these particular values as the lower limit of hydrogen chloride concentration is further set forth in Fig. 3 which is a plot showing the relation between the pressure required to produce an iron compact having a green (unsintered) density of 5.8 grams per cubic centimeter and the concentration of HCl in the reducing gas employed in the production of the powder used for the compact. A number of curves are given for different temperatures. Since the molding pressure required to produce a compact of this same density from standard iron powder made by the "subtractive" method, i. e. mill scale reduced by hydrogen at 1800° F. to 1900° F. is about 50,000 pounds per square inch, it is considered that conditions of HCl concentration and temperature which will produce iron powder requiring less pressure to form it into a compact of the same density is within the scope of the present invention. As will be seen from the photomicrographs subsequently referred to, the characteristic structure of iron powder made by the "additive" method of the present process is clearly distinguishable from the characteristic structure of iron powder made by the prior art "subtractive" method either utilizing a reducing gas containing no hydrogen chloride at all, or a reducing gas containing an insufficient concentration of hydrogen chloride in relation to the reduction temperature.

In powder metallurgy it is desirable that iron powder be easily moldable, that is, that the pressures required to form it into a compact of a given density be as low as possible. An iron powder having this quality is preferable to a powder having a high molding pressure in that it enables the use of smaller presses in the production of compacts to be heat treated; or if the same pressure is applied, it allows the production of a part of greater density. Dense parts are generally desirable with respect to physical characteristics since their physical properties, such as tensile strength, are generally superior to those of less dense compacts made of the identical material. From the family of curves in Fig. 3 it will be seen that the molding pressure generally decreases as the percentage hydrogen chloride in the reducing gas increases, but that the curves tend to flatten out. Also, at a given hydrogen chloride concentration, the molding pressure tends to decrease with an increase in reducing temperature. The data from which the curves in Fig. 3 were plotted are set forth in Table II below:

TABLE II

| Temperature, ° F. | HCl Concentration in Percent by Volume | Briquetting Pressure in Pounds per Square Inch |
|---|---|---|
| 1,200 | 1 | 55,000 |
| 1,200 | 2 | 52,000 |
| 1,200 | 4 | 45,000 |
| 1,200 | 6 | 43,000 |
| 1,400 | 2 | 49,000 |
| 1,400 | 4 | 36,000 |
| 1,600 | 0.5 | 53,000 |
| 1,600 | 1 | 49,000 |
| 1,600 | 4 | 34,000 |
| 1,800 | 0.5 | 51,000 |
| 1,800 | 1 | 46,000 |
| 1,800 | 2 | 39,500 |
| 2,000 | 0.5 | 45,000 |
| 2,000 | 1 | 42,500 |

The tests upon which these results were based were also made upon iron oxide pellets which had been roasted (oxidized) substantially to Fe₂O₃ before reduction. While the absolute values of molding pressure will vary somewhat depending upon the type of starting material used, the trend of variations with temperature of reduction and hydrogen chloride concentration is the same as those exemplified by these curves for any type of starting material useful in the present process. Thus it is possible to produce iron powder having predetermined characteristics with respect to the molding pressure.

The upper limit of hydrogen chloride concentration is less sharply critical insofar as effects on the structure and properties of the iron powder produced are concerned. From the economic standpoint, it is considered essential that substantially all the iron values being reacted be converted from iron oxide to metallic iron and that the amount of ferrous chloride formed in a non-evanescent state be minimized.

It has been found that in order to prevent substantial formation of such ferrous chloride, it is necessary to keep the hydrogen chloride content of the reducing gas below the values set forth in Table III below:

TABLE III

| Reduction Temperature ° F. | Maximum HCl Concentration in Percent by Volume |
|---|---|
| 1,200 | 12 |
| 1,300 | 17 |
| 1,400–2,000 | 25 |

In Fig. 2, this upper limit is indicated by the curve ED and the horizontal straight line DC. Thus, broadly, the invention is practiced by maintaining the temperature and HCl concentration of the reducing gas at such values that they fall within the area defined by the curves AB, ED and the horizontal line DC together with vertical lines AE and BC, in Fig. 2. In actual practice it has been found that the advantages gained by high hydrogen chloride concentration with respect to increased moldability of the product formed, are not great enough to warrant the use of hydrogen chloride concentrations of much more than about 6%. It might be supposed that all physical properties would be uniformly benefited with increase in HCl content because of the increased degree of recrystallization of iron values taking place. However, as will be more specifically pointed out in subsequent examples, this is not the case; and for practical purposes embracing both the economics of the process and the physical properties of the product, 6% may be taken as a reasonable limit.

Figure 4:
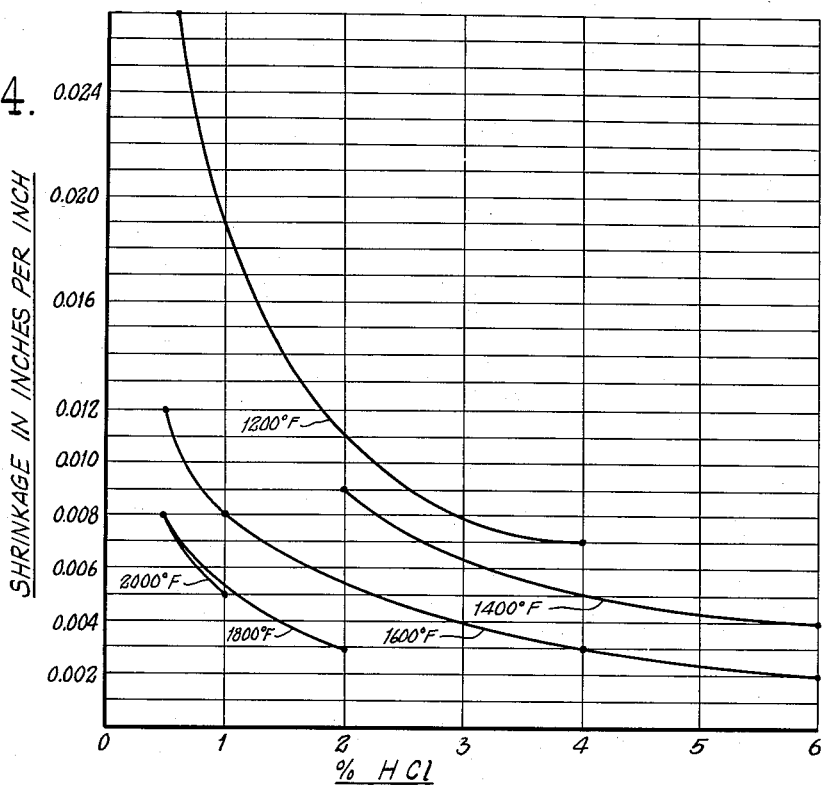
Fig. 4 is a plot showing the relationship between the shrinkage of a compact of iron powder during sintering and the concentration of hydrogen chloride in the reducing gas used to make the powders from which these compacts were made, respectively.

One of the principal advantages of the process of the present invention is that the physical properties of iron powder produced thereby may be controlled by controlling the temperature and hydrogen chloride concentration at which the powder is produced. In Fig. 3 it has already been illustrated how these conditions affect the pressure required to press the iron powder into a compact having given density. In Fig. 4 is a plot of percentage hydrogen chloride in the reducing gas against the shrinkage of parts made therefrom in terms of inches per inch. The shrinkage referred to is that which takes place when iron powder is formed in a compact under pressure and the compact is heat treated in a reducing atmosphere at about 2000° F. Generally it is desired that this shrinkage be relatively small, but more important than the magnitude of the shrinkage is its predictability, so that dies may be designed to produce parts which when ultimately finished will have a precise predetermined size. Fig. 4 shows a family of curves representing various temperatures of reduction. It is seen that generally the shrinkage decreases as the concentration of hydrogen chloride in the reducing gas increases. It will be further observed that at any given hydrogen chloride concentration the shrinkage generally decreases with increases in the reducing temperature. The data from which the curves in Fig. 4 were plotted is reproduced in Table IV below.

TABLE IV

| Reduction Temperature, °F. | HCl Concentration, Percent | Shrinkage in Inches per inch |
|---|---|---|
| 1,200 | 0.6 | 0.027 |
| 1,200 | 2 | 0.011 |
| 1,200 | 4 | 0.007 |
| 1,400 | 2 | 0.009 |
| 1,400 | 6 | 0.004 |
| 1,600 | 0.5 | 0.012 |
| 1,600 | 1 | 0.008 |
| 1,600 | 2 | 0.006 |
| 1,600 | 4 | 0.003 |
| 1,600 | 6 | 0.002 |
| 1,800 | 0.5 | 0.008 |
| 1,800 | 2 | 0.003 |
| 2,000 | 0.5 | 0.008 |
| 2,000 | 1 | 0.005 |

These data were obtained by the reduction of iron oxide pellets which had previously been roasted in air to oxidize them substantially to $Fe_2O_3$. While the absolute values of the shrinkages obtained will differ somewhat depending upon the nature of the ore used as a starting material, the trend of shrinkage with respect to variations in reducing temperature and concentration of hydrogen chloride in the reducing gas will generally be the same as is indicated in Fig. 4 for other type of iron oxide-containing material adaptable to this process. Thus within certain limits it is possible to manufacture an iron powder having predetermined shrinkage characteristics.

For the sake of comparing the physical properties of powder made by the process of the present invention with those of iron powder made by prior art "subtractive" methods, it should be noted that the shrinkage obtained for a typical reduced mill scale powder is 0.012 inch per inch and its molding pressure is 50,000 pounds per square inch. This prior art powder was produced by the reduction of mill scale by hydrogen at a temperature of about 1800° F. to 1900° F. It is to be noted that many of the examples set forth in Figs. 3 and 4 above were produced at temperatures as much as 600° F. to 700° F. lower and yet were superior with respect to both moldability and shrinkage. Thus an advantage of the process may be seen to be the fact that by it, iron powder of superior properties may be produced at temperatures so low that they were formerly considered to be completely impractical for iron oxide reduction by the prior art.

The variation of the tensile strength of iron compacts produced by sintering in hydrogen at 2030° F. the iron powder made with reducing gas containing various concentrations of HCl is illustrated in Fig. 5. This is a plot of tensile strength against percent HCl in the reducing gas for a high grade ore containing mainly $Fe_2O_3$ and reduced at 1400° F. The data plotted in Fig. 5 is reproduced in Table V below:

TABLE V

| Percent HCl by Volume | Tensile Strength in Pounds Per Square Inch |
|---|---|
| 1 | 25,000 |
| 2 | 23,500 |
| 4 | 19,200 |
| 6 | 16,000 |

In comparing data set forth in the above table with the data on moldability and shrinkage set forth in Tables II and IV respectively, it can be seen that although the first two properties are generally improved as hydrogen chloride concentration increases, present evidence is that tensile strength falls off steadily as the percentage of hydrogen chloride increases. Thus it is often necessary, in producing iron powder for powder metallurgy purposes, to select conditions so as to strike a compromise between optimum moldability and shrinkage on one hand and optimum tensile strength on the other. The exact values to be chosen are determined by the specifications of the fabricator which, in turn, depend on the end use to which the powder is to be put. Although the absolute values for tensile strength will vary somewhat depending upon the type of raw material used, the trend is the same in all cases as that illustrated by Fig. 5.

Consideration of the variations of physical properties as illustrated by the foregoing figures indicates that in order to obtain the best combination of physical properties, the process should not be operated at the extreme limits of temperature and HCl concentration included in the area ABCDE in Fig. 2. In practice the most generally desired iron powder, from a commercial standpoint, is that made in the temperature range of from about 1250° F. to about 1650° F. using a reducing gas having an HCl concentration of between about 3% and about 6% by volume.

Figure 6:
Fig. 6 is a photomicrograph at 1000× magnification of a specimen of reduced mill scale which was reduced by hydrogen in the absence of hydrogen chloride in the conventional manner as known to the prior art.

It is readily apparent that physical properties are dependent upon the amount of hydrogen chloride used in the reducing gas and this is suggestive of the fact that changes in the actual physical structures of the iron powder are produced by varying the amount of hydrogen chloride employed. This is illustrated by a series of photomicrographs which will now be described:

Fig. 6 is a photomicrograph taken at a magnification of 1000X of a typical prior art iron powder made by the "subtractive" method. In this and the other photomicrographs described herein, the white portion is metallic iron while the dark portions represent either occlusions of unreduced oxide or voids as the case may be. This powder was made by the reduction of mill scale with hydrogen at temperatures between 1800° F. and 1900° F. The porous "gouged-out" structure of this powder is self-evident. The particles are filled with intersties and voids suggesting that some material has been taken away or subtracted from the original mass and thus prompting the use of the term "subtractive" in connection with this type of material.

Figure 7:
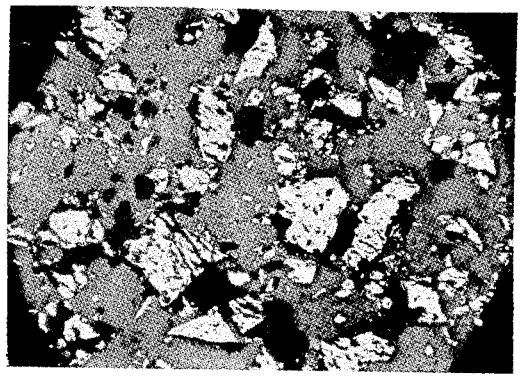
Fig. 7 is a photomicrograph at 1000× magnification of a typical iron oxide concentrate useful as a starting material in the process of the present invention.

Fig. 7 is a photomicrograph taken at magnification of 1000X, showing a typical iron oxide concentrate, in this case a magnetite, which may be used as a starting material in the present process. It has a typical jagged iron oxide structure which will be seen to be quite different from the structure of iron powders made in accordance with the present invention.

Figure 8:
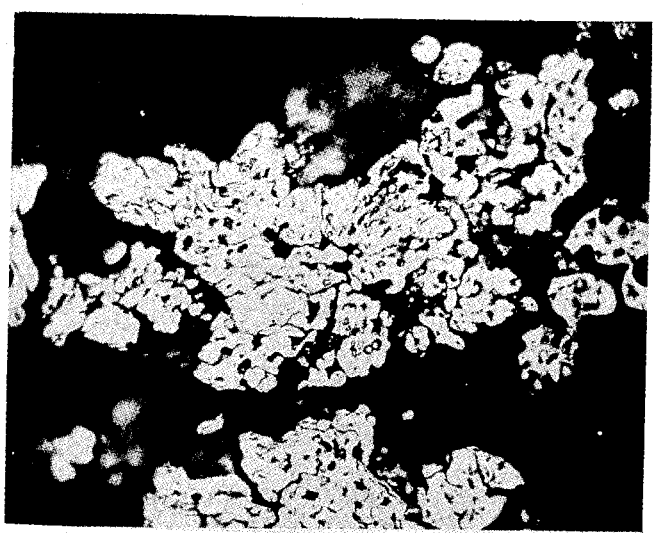
Fig. 8 is a photomicrograph at 1000× magnification of a specimen of iron powder made using a reducing gas containing 0.5% hydrogen chloride at a temperature of 1400° F.

Fig. 8 is a photomicrograph taken at magnification of 1000X of a high grade hematite ore reduced at 1400° F. in an atmosphere of hydrogen containing 0.5% by volume of hydrogen chloride. It is to be noted from reference to Fig. 2, that this condition is not in accordance with the present invention. This will be further borne out by a comparison of Fig. 8 with Fig. 6, since Fig. 6 also illustrates particles having a typical subtractive structure characterized by excessive porosity and the appearance of having had portions thereof gouged away. It is obvious from a comparison of these two photographs that the use of 0.5% hydrogen chloride at 1400° F. was insufficient to cause enough recrystallization of iron values to convert the iron from the typical subtractive structure known to the prior art to the new "additive" type iron.

Figure 9:
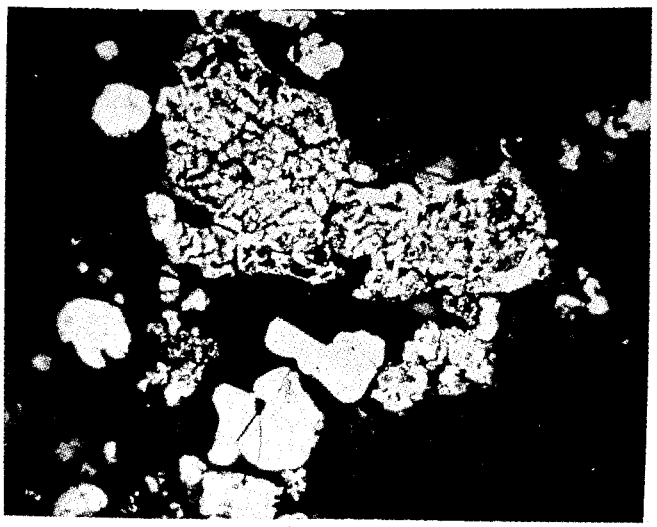
Fig. 9 is a photomicrograph at 1000× magnification of a specimen of iron powder made using a reducing gas containing 1% hydrogen chloride at a temperature of 1400° F.

Fig. 9 is a photomicrograph taken at magnification of 1000X showing iron powder reduced from the same type of ore (as in Fig. 8) at 1400° F. with a reducing gas consisting of hydrogen and 1% by volume of hydrogen chloride. Again it will be noted that the iron particle is characterized by the porous subtractive structure as was the case in Fig. 6. However, in a few places it will be seen that the iron has recrystallized to a small extent to form minute amounts of dense crystalline iron. This photomicrograph illustrates that at 1400° F. 1% by volume of hydrogen chloride is insufficient to cause the degree of recrystallization necessary to convert the "subtractive" iron structure of the prior art to the "additive" iron structure of the present invention. This illustrates clearly that the mere presence of some, but insufficient, hydrogen chloride in the reducing gas is a condition outside the scope of the present invention.

Figure 10:
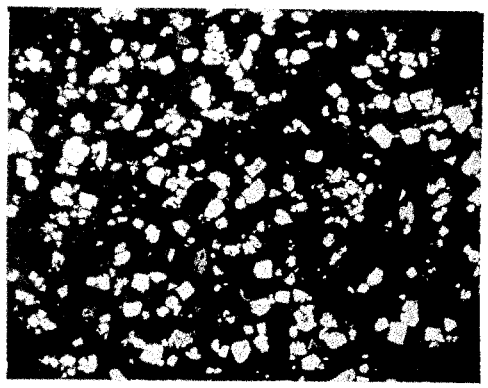
Fig. 10 is a photomicrograph at 1000× magnification of a specimen of iron powder made using a reducing gas containing 2% hydrogen chloride at a temperature of 1400° F.

Fig. 10. is a photomicrograph at 1000X magnification of iron oxide reduced at 1400° F. with a reducing gas consisting of hydrogen and 2% by volume of hydrogen chloride. It will be noted that the particles here are much smaller than those in Figs. 8 and 9, but that they are characterized by having a discrete shape which differs from the jagged shape which characterizes both the original ore particles and that of particles made by the "subtractive" process. It will also be noted that the particles are characterized by a dense crystalline structure, although a few of them still retain the porous structure of the "subtractive" iron. This sample was produced under conditions which are just within the conditions required for production of "additive" iron, in accordance with the present invention. Sufficient recrystallization has taken place to convert the iron from the characteristic "subtractive" structure to the dense crystalline "additive" structure.

Figure 11:
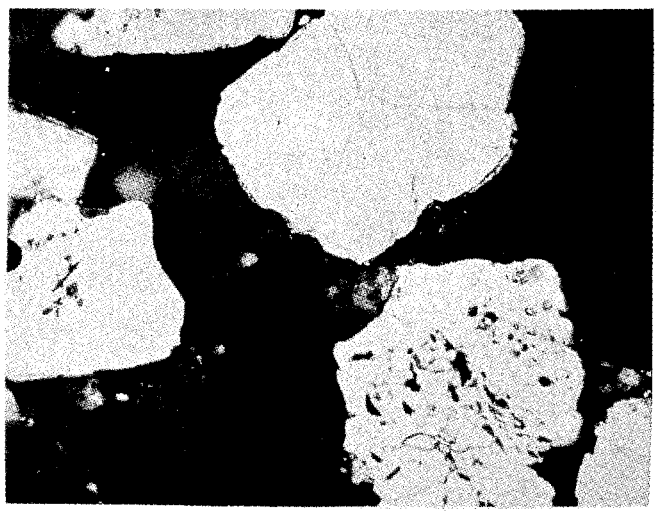
Fig. 11 is a photomicrograph at 1000× magnification of a specimen of iron powder made using a reducing gas containing 4% hydrogen chloride at a temperature of 1400° F.

Fig. 11 is a photomicrograph at 1000X magnification of iron oxide reduced at 1400° F. with gas containing hydrogen and 4% by volume of hydrogen chloride. It will be noted that crystals of iron in this case have grown much larger than those shown in Fig. 10 and that the particles are now definitely characterized by a dense crystalline structure, although a very small amount of porosity may be present in some of the crystals. This sample was produced under conditions which are definitely within the preferred range of the process of the present invention and further illustrate the transition from prior art "subtractive" structures to the "additive" iron structure.

Figure 12:
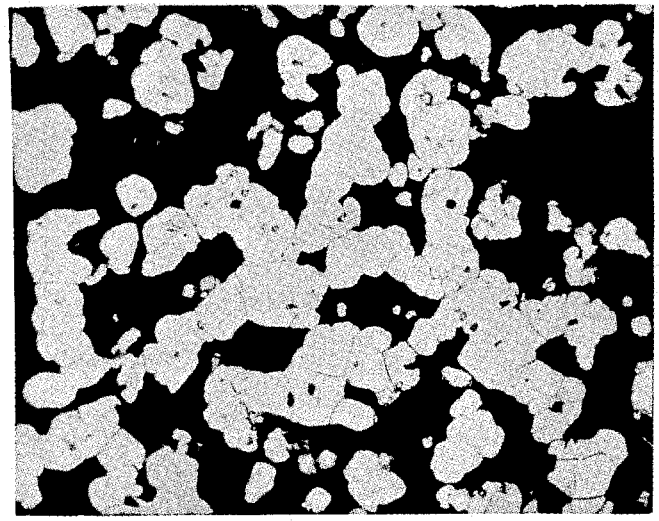
Fig. 12 is a photomicrograph at 1000× magnification of a sample of iron powder prepared by the reduction of iron oxide with hydrogen containing 4% by volume of hydrogen chloride in the temperature range of 1250° F. to 1500° F.

Fig. 12 is a photomicrograph taken at magnification of 1000X and shows iron powder reduced by hydrogen containing 4% hydrogen chloride by volume in the temperature range of 1250° F. to 1500° F. In this sample, the iron crystals have formed into aggregates which are independent of the shape of the original ore material and which are dense and crystalline as opposed to the porous structure of the prior art "subtractive" iron. This figure illustrates that the production of "additive" iron powder may be carried on at varying temperatures providing that the temperature and hydrogen chloride concentration are such as to be within the limits set forth in accordance with Fig. 2 above.

Figure 13:
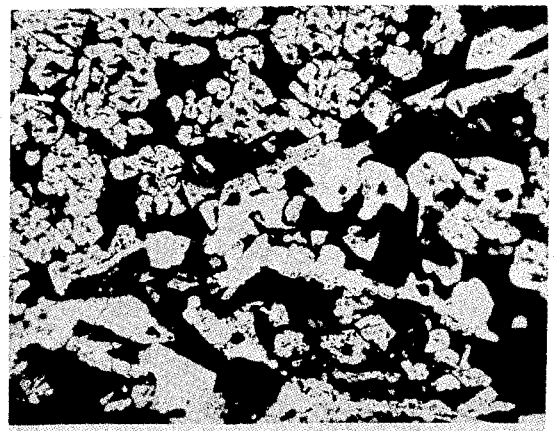
Fig. 13 is a photomicrograph at 1000× magnification of iron powder prepared by the reduction of iron oxide with hydrogen containing 2% hydrogen chloride by volume at 1110° F.

Fig. 13 is a photomicrograph taken at magnification of 1000X showing iron powder made by reducing iron oxide at a temperature of 1110° F. with hydrogen containing 2% of hydrogen chloride by volume. Although a few dense "additive" crystals may be detected within the mass, the great majority of the particles are of the porous "subtractive" type. This photomicrograph further illustrates that the mere presence of hydrogen chloride is insufficient to convert the iron powder from the prior art "subtractive" structure to the dense crystalline "additive" structure of the present process to a degree sufficient to enable the powder to be characterized as "additive." It is necessary that both hydrogen chloride concentration and temperature be within the limits set forth above. Comparison of Fig. 13 with Fig. 10 illustrates the difference in structure that is obtained using the same percentage hydrogen chloride but at different temperatures, the conditions of Fig. 10 being within the invention and those of Fig. 13 being outside the invention.

Figure 14:
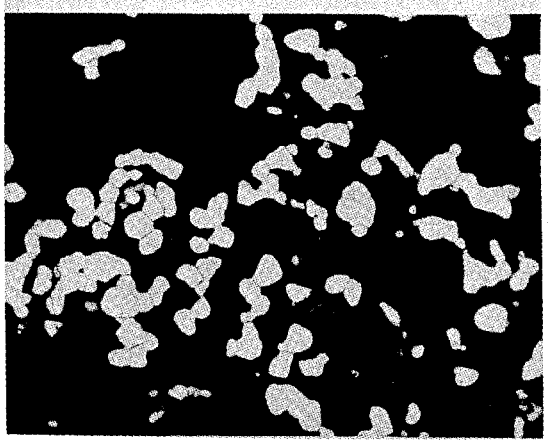
Fig. 14 is a photomicrograph taken at 1000× magnification of iron powder produced by the reduction of ferrous chloride with hydrogen at 1100° F.

Fig. 14 is a photomicrograph taken at 1000X magnification showing iron powder produced by the reduction of solid ferrous chloride with hydrogen. The iron crystals are dense and are substantially identical in appearance with the powders made by the reduction of iron oxide, in accordance with the present invention. By thus comparing the iron made from reducing ferrous chloride with the iron made by the reduction of iron oxide by conventional "subtractive" methods, it becomes apparent that in all probability the iron produced in accordance with the present process results from a process in which the reduction of $FeCl_2$ is a step, rather than from a process involving only the taking away of oxygen from iron oxide.

The process of the present invention may be carried out utilizing raw material either in a loose pulverulent state or in the form of aggregates either naturally occurring, as in the form of lumps, or prepared specially for this process, as in the case of pellets. In any event, the metallic iron produced after the reduction step will generally be in a semi-adherent condition requiring some degree of treatment to convert it into powder of the proper mesh size and apparent density. This comminution and densification may be carried out by any conventional means known to the prior art which are now in use in connection with other iron powder processes.

In addition to producing metallic iron having properties which are particularly useful for powder metallurgy, the present process has the additional advantage of providing a method of separating iron values from other compounds of the class which may be referred to as gangue materials. Although in many cases these gangue materials are not valuable in themselves, there are a number of instances where iron occurs naturally in a form wherein it is closely mixed with another valuable compound, for example, titanium dioxide. In many iron-titanium ores and in many other iron ores, the iron and the gangue are closely locked together in the form of spinel-like material. In the case of some titanium ores, the titanium values are colloidally dispersed throughout the iron-bearing material so that separation of the iron from the gangue values, such as titanium, is very difficult. It is evident that when conventional "subtractive" methods of reducing iron oxide are employed, even though the iron is converted to a magnetic form, i. e., metallic iron, it is still not separable from the gangue because the iron, being immobile, is still intimately mixed with and in many cases actually surrounded by and, in effect, locked in by non-magnetic foreign material.

However, when iron oxide is reduced to metallic iron by the process of the present invention which is believed to involve converting the iron through the mobile ferrous chloride vapor stage as aforesaid, it is apparent that means is provided for unlocking the iron values no matter how intimately they are intermixed with the foreign gangue material. Thus, by operating within the limits of temperature and HCl concentration set forth herein, it has been found possible to mobilize the iron values and to free them from the locking influence of gangue, so that they may be more amenable to separation by conventional means such as magnetic separation, flotation or washing. This is because the iron values having been converted to a mobile vapor, are reduced and condensed upon other iron crystals in a place physically removed from the surrounding gangue. Thus, metallic iron useful for powder metallurgy purposes may be obtained in this way and in some cases as, for example, where titanium dioxide is the gangue material, a valuable by-product rich in titanium dioxide is obtained. The same is true for processes of enriching material with respect to such valuable minerals as chromium, manganese, etc. By using this process it has been found possible to convert a low grade titanium-bearing sand to a high grade concentrate containing 94% $TiO_2$, while at the same time recovering iron powder having physical properties useful in powder metallurgy by means of a reduction step in accordance with the present process followed by conventional magnetic separation and washing steps.

Details of such a process will be set forth in the subsequent examples.

In addition to providing a method for recovering valuable by-products, reduction according to the present invention makes it easier to remove very small amounts of impurity from the iron powder and thus to improve its physical properties.

In practicing the process of the present invention, it is necessary to provide as aforesaid, a reducing gas containing the selected percentages of hydrogen chloride. When a gas is referred to as containing 2% hydrogen chloride, it means that the HCl amounts to 2% by volume of the total of the hydrogen chloride and the "active" hydrogen present. Thus, where other gases are mixed with the hydrogen and HCl, whether they be chemically inert materials such as nitrogen or whether they be additional reducing gases, such as methane, they are not to be included in computing the amount of hydrogen chloride. For example, a gas containing 50% nitrogen, 48% hydrogen and 2% hydrogen chloride would have the same effect on physical properties as a gas containing 96% hydrogen and 4% hydrogen chloride. In the appended claims, the term "active hydrogen chloride" concentration refers to the hydrogen chloride concentration computed on this basis.

The term "active" hydrogen referred to above means that hydrogen which actually will be free to react with iron oxide and/or ferrous chloride. Therefore, it does not include that amount of hydrogen which is in chemical equilibrium with the water vapor that may be present in the system. The amount of hydrogen so in equilibrium may be readily calculated from the equilibrium constant of the chemical reaction $$FeO + H_2 = Fe + H_2O$$

Therefore this factor must be taken into consideration in carrying out the process in order to regulare the physical properties of the product. The following sampel calculation illustrates how this factor is taken into account:

Assume the following data given:

| Temperature | Composition by Volume for Available Reducing Gas | |
|---|---|---|
| | | Percent |
| 1,400° F. | Hydrogen | 87 |
| | Water Vapor | 10 |
| | Hydrogen Chloride | 3 |

Take as a basis 100 mols of such gas, which will contain the following components: $H_2 = 87$ mols, $H_2O = 10$ mols, $HCl = 3$ mols. At 1400° F., the equilibrium constant of the reaction $FeO + H_2 = Fe + H_2O$ is 0.47, i. e.

$$\left(\frac{H_2O}{H_2}\right) = 0.47 \text{ or } \frac{(H_2O)}{0.47} = (H_2)$$

Therefore, the hydrogen required to off-set the water vapor is $$\frac{10}{0.47}$$

or 21.3 mols. This leaves as "active" hydrogen 87—21.3 or 65.7 mols. The concentration of "active" hydrogen chloride is based on the sum of "active" hydrogen and hydrogen chloride, i. e.

$$\frac{3}{65.7 + 3} \times 100$$

or 4.36%.

If it be desired to convert this gas to one having an "active" hydrogen chloride content of 3%, the amount of hydrogen that would be required for addition to each 100 mols of such gas would be calculated as follows:

Let $m$ = mols of hydrogen to be added $$\frac{3}{65.7 + 3 + m} \times 100 = 3$$

$$\frac{3}{68.7 + m} = \frac{3}{100}$$

by dividing both sides of the equation by 100
$3m + 206.1 = 300$ by cross-multiplying
$3m = 93.9$
$m = 31.3$ It is also to be noted that in the operation of the present process the tendency to form "additive" iron is increased slightly by a slowing down of the rate of reaction as by supplying the hydrogen chloride containing reducing gas at a slower rate.

Example I

A very pure, naturally occurring, Liberian ore containing 88% $Fe_2O_3$ and 12% $Fe_3O_4$ was mixed with 5% by weight of minus 325 mesh iron powder of the "additive" type and about ½% by weight of cornstarch binder and formed into ¾ inch diameter pellets. The purpose of the addition of the iron powder was to impart strength to the pellets so that they would not crumble during reduction and so that they could be piled on one another without crumbling under their own weight. About 65 pounds of these pellets were placed in a reducing furnace and contacted therein with a gas therein 96% hydrogen and 4% hydrogen chloride by volume at a temperature of about 1400° F. The reducing gas was passed upwardly through the bed of ore pellets at the rate of about 25 cubic feet a minute at atmospheric pressure. This treatment was continued for 124 minutes. At the end of this time, room temperature hydrogen was introduced into the reactor in order to cool the pellets. This cooling period continued for about thirty minutes and then the reactor was purged with room temperature nitrogen. The reduced pellets were removed from the furnace and were ground so that 95% passed through a 100 mesh screen. The powder was then pressed into bars at a pressure of 80,000 pounds per square inch and the bars were sintered in pure hydrogen for one hour at a temperature of 2030° F. A resulting sintered piece had a tensile strength of 20,600 pounds per square inch as compared with a tensile strength of 18,300 pounds per square inch for a piece prepared in the identical manner from a conventional iron powder made by the hydrogen reduction of mill scale at 1800° F. to 1900° F. in pure hydrogen.

This example illustrates a typical method for preparing desirable iron powder in accordance with the process of the present invention.

*Example II*

In some cases it is desirable to carry the reduction of iron oxide substantially to the form of FeO in pure hydrogen before introducing a gas containing hydrogen chloride into the reaction zone. A typical reduction utilizing this method started with a concentrated magnetite having the following analysis:

| | Per cent |
|---|---|
| Fe | 71.4 |
| Mn | 0.07 |
| P | 0.01 |
| $SiO_2$ | 0.21 |
| MgO | 0.07 | the balance being substantially all oxygen combined with iron as $Fe_3O_4$.

This concentrate is mixed with about one-half percent of cornstarch binder and is formed into pellets. These pellets are then placed in the reactor and are roasted in air for one hour at about 1400° F. to convert the $Fe_3O_4$ to $Fe_2O_3$. Then hydrogen at 1400° F. is contacted with the roasted pellets at a rate of about 25 cubic feet per minute. After about 20 minutes of this treatment, the $Fe_2O_3$ has been reduced substantially to the form of FeO. The bed was then contacted with a gas containing 98% hydrogen and 2% hydrogen chloride by volume at 1400° F. for an additional two hours. At the end of this time, the reduced pellets were cooled in room temperature hydrogen, removed from the furnace and ground so that all the particles passed through a 100 mesh screen. The powder was then pressed at 60,000 pounds per square inch and sintered in hydrogen for one hour at 2030° F. The resulting piece had a tensile strength of 23,000 pounds per square inch, as well as being satisfactory with respect to its moldability, shrinkage and other physical properties.

*Example III*

Because it is not always possible or convenient to obtain the hydrogen used as a reducing gas in pure form, it is sometimes necessary to carry out the reduction step with a reducing gas containing some substances other than hydrogen and hydrogen chloride. In the case of nitrogen, which is neutral to the reaction taking place, it has been found that the reduction proceeds just as though the nitrogen were absent except that it appears to proceed at a somewhat slower rate. In cases where nitrogen or other diluent gases are present, the critical percentage of hydrogen chloride is to be calculated on the basis of the total volume of hydrogen and hydrogen chloride present. Thus, where an iron oxide concentrate, the analysis of which was given in Example II above, is formed in pellets in the normal way and oxidized by roasting in air, it may be reduced by a gas containing about 88% hydrogen, 2% hydrogen chloride and 10% nitrogen. This reduction was carried out at about 1400° F. in the same manner described in the previous two examples and required about 135 minutes to complete. The powder obtained therefrom was ground, briquetted to a density of 6.7 grams per cubic centimeter and sintered in the usual manner. This sintered body was found to have a tensile strength of 29,800 pounds per square inch. This compared with a tensile strength of 25,000 pounds per square inch of a compact having the same density prepared in exactly the same way except that pure hydrogen and hydrogen chloride were used instead of a mixture of hydrogen, nitrogen and hydrogen chloride. In other physical properties the powder made by reduction in the presence of nitrogen was comparable to powder made using a mixture consisting solely of hydrogen and hydrogen chloride as a reducing agent. This illustrates that a reducing gas containing constituents other than hydrogen may be employed provided that a sufficient quantity of hydrogen is used to carry the reduction reaction to completion.

*Example IV*

Since it is often convenient to obtain hydrogen mixed with other reducing gases such as methane, it is often desirable to carry out the process using such gases. When a gas containing about 10% methane, 2% hydrogen chloride and 88% hydrogen by volume was used as the reducing agent in a process operating under exactly the same conditions as those described in Example III above, a powder resulted which, when pressed to a density of 6.45 grams per cubic centimeter and subsequently sintered in the usual way produced a piece having a tensile strength of 27,000 pounds per square inch. Since this compares closely with the values obtained by using a mixture of hydrogen, nitrogen and hydrogen chloride and a mixture of hydrogen and hydrogen chloride alone, as aforesaid, it is evident that the presence of another gas, whether it be neutral as in the case of nitrogen, or whether it be chemically reactive, as in the case of methane, does not impair the operation of the "additive" reduction process.

*Example V*

As an example of the operation of the process at the extreme upper limit of hydrogen chloride concentration, pellets made of the magnetite concentrate, the analysis of which is given in Example II above, were roasted in the standard manner in air at 1400° F. and were treated with a gas containing 75% hydrogen and 25% hydrogen chloride by volume for a period of two hours at a temperature of 1400° F. The tensile strength of a sintered piece made from the resulting powder was somewhat lower than is normally desired, being only about 15,000 pounds per square inch. This piece had a green density of 6 grams per cubic centimeter. It is thus possible to produce metallic iron of the desired "additive" type without excessive formation of ferrous chloride under these conditions.

*Example VI*

As an example of another form of iron oxide that has been successfully used as a starting material for the present process, a mill scale having the following chemical analysis may be given:

| | Per cent |
|---|---|
| Fe | 75.25 |
| Acid insolubles | 0.19 |
| Mn | 0.4 |
| S | 0.015 |
| $SiO_2$ | 0.05 | the balance being principally oxygen combined with iron.

When formed into pellets and reduced at 1400° F. with a mixture of 96% hydrogen and 4% hydrogen chloride, a satisfactory iron powder was produced, from which a sintered piece having a tensile strength of about 21,000 pounds per square inch was made. This piece had a green density of 6.2 grams per cubic centimeter. Thus, any form of iron oxide, be it as $Fe_3O_4$ as in the present case, or as $Fe_2O_3$ as in Example I or as FeO as in Example II may be used as the starting material for the process of the present invention.

*Example VII*

As an example of the use of the process of the present invention to effect an efficient separation between iron values and non-iron values, the following example may be given:

An ilmenite-type iron-titanium ore having the following analysis was reduced at 1400° F. with a reducing gas containing 96% hydrogen and 4% hydrogen chloride:

| | Percent |
|---|---|
| Fe | 46.94 |
| $TiO_2$ | 27.5 |
| $Al_2O_3$ | 1.22 |
| $SiO_2$ | 2.88 |
| Mn | 0.25 |
| CaO | 0.55 |
| MgO | 9.96 | the balance being principally oxygen combined with iron.

During the reduction of this ore a weight loss of about 17% occurs. The resulting reduced material was then washed with a solution of sodium oleate during the course of which treatment about 8% by weight of the reduced material was lost. This treatment separated the material into a heavy iron-containing fraction and a light pigment fraction. The light pigment fraction which amounted to 32.5% of the weight of the original unreduced ore contained 94% titanium dioxide with the balance principally metallic iron. The heavy iron fraction which settled to the bottom during the washing step contained 92.6% metallic iron with the balance being gangue. The separated titanium dioxide fraction is commercially valuable. The iron in this ore is present substantially as magnetic $Fe_3O_4$ so that it might be expected that a good separation between $Fe_3O_4$ and the $TiO_2$ could be made magnetically. However, so closely interlocked are the iron and titanium values that when a magnetic separation of this same ore was attempted, the magnetic fraction contained 49.4% iron and 16.23% titanium, while the non-magnetic fraction contained 46.74% iron and 15.18% titanium. Practically no separation of the iron and titanium values was obtained by conventional separation methods. When reduction, in accordance with the present process, combined with a conventional washing step were employed, however, a very good separation was obtained and a fraction containing a very high percentage of titanium oxide resulted.

*Example VIII*

Certain industrial applications of powder metallurgy require the use of an iron powder having extremely low shrinkage, less emphasis being placed on the excellence of other properties such as moldability and tensile strength. In producing iron powder for such applications, it may be desirable to use as a starting material a semi-reduced mixture of iron oxide and metallic iron of the conventional "subtractive" type. Such a starting material may be produced by treating iron oxide with either a gaseous or a solid reducing agent for a sufficient length of time to convert some of the iron oxide to metallic iron which may be of the "subtractive" type. This semi-reduced material is subsequently contacted with a mixture of hydrogen and hydrogen chloride to complete the reduction of the remaining iron oxide to metallic iron.

An iron oxide concentrate having the same chemical composition as that set forth in Example II was formed into self-sustaining pellets and placed in a reducing furnace of the kind previously described. These oxide pellets were then treated with hydrogen (absent hydrogen chloride); and the amount of reduction that had taken place during any given period was measured by the amount of water vapor evolved. When the reduction had proceeded to the extent desired, a predetermined volume of hydrogen chloride was added to the hydrogen and the reduction was continued at the same temperature until substantially all the remaining iron oxide present had been converted to metallic iron (additive iron). Several tests were made at different temperatures in which a gas containing 4% hydrogen chloride was introduced after the reduction had been carried to various degrees of completion. Table VI below sets forth the physical properties of iron powders reduced under different conditions as set forth in this example.

*Table VI*

| Reduction Temperature in ° F. | Percent Reduction in Absence of HCl | Shrinkage During Sintering in In./in. | Tensile Strength of Sintered Piece in p. s. i. | Pressure Needed to Produce Green Density of 5.95 g./cc. in p. s. i. |
|---|---|---|---|---|
| 1,400 | 25 | 0.0048 | 15,000 | 45,000 |
| 1,400 | 60 | 0.0055 | 17,500 | 50,000 |
| 1,600 | 40 | 0.0022 | 11,000 | 37,500 |
| 1,600 | 60 | 0.0020 | 14,000 | 42,000 |
| 1,600 | 80 | 0.0021 | 16,000 | 48,000 |
| 1,800 | 25 | 0.0010 | 10,000 | 35,500 |
| 1,800 | 60 | 0.0015 | 12,500 | 40,000 |
| 1,800 | 80 | 0.0015 | 15,000 | 42,000 |

It is to be understood that while the theory of the mechanism of the reduction process as outlined herein is presently believed to be correct and is supported by considerable experimental evidence, such theory is set forth for whatever it is worth. No reliance is placed on the correctness of this theory in support of the patentability of the appended claims.

It is to be further understood that equivalent processes, other than those specifically disclosed herein, will occur to those skilled in the art from the foregoing disclosure and as such are to be included within the purview of the present invention which is to be limited only by the scope of the appended claims.

What is claimed is:

1. The process of making moldable crystalline iron having predetermined physical properties useful in powder metallurgy, comprising the steps of treating in a reducing zone a solid starting material comprising at least one of the oxides of iron having an atomic ratio of oxygen to iron of at least one, by passing through said reducing zone in contact with the solid material therein a reducing gas containing hydrogen, as an essential active reducing ingredient, and hydrogen chloride, the active hydrogen chloride concentration of said reducing gas being at least about as great as that represented by the line AB in Fig. 2 of the drawing and not more than about 6%, maintaining the temperatures in said zone within the range of about 1200° F. to about 2000° F., and maintaining contact between said reducing gas and said starting material for a time sufficient to reduce substantially all the iron oxide content of said starting material to metallic iron.

2. The process according to claim 1, wherein the temperatures within said zone are maintained within the range of about 1250° F. to about 1650° F.

3. The process according to claim 1, wherein said solid starting material is prepared by forming the solid material thereof into self-sustaining pellets, said pellets being introduced as such into said reducing zone; and wherein, following the reduction operation, the reduced pellets are cooled under non-oxidizing conditions to a temperature such that they may be exposed to the atmosphere without substantial spontaneous oxidation, and thereafter the pellets are comminuted to form iron powder.

4. The process according to claim 1, in which the solid starting material supplied to the process as aforesaid includes material other than iron and reduceable iron compounds, which other material it is desired to separate from the metallic iron produced by this process; and wherein, following the reduction operation as aforesaid, the resulting metallic iron is separated from such other material which is then admixed therewith.

References Cited in the file of this patent

UNITED STATES PATENTS 2,413,492  Firth _____ Dec. 31, 1946

FOREIGN PATENTS 740,913  Germany _____ Nov. 1, 1943